United States Patent
Doutney et al.

(10) Patent No.: US 7,528,567 B2
(45) Date of Patent: May 5, 2009

(54) SAFETY INTERLOCK SYSTEM AND METHOD FOR DISRUPTING STEPPER MOTOR CONTROL SIGNALS

(75) Inventors: George J. Doutney, Sandy Hook, CT (US); Michael J. Lorello, Guilford, CT (US)

(73) Assignee: Pitney Bowes Inc., Stamford, CT (US)

( * ) Notice: Subject to any disclaimer, the term of this patent is extended or adjusted under 35 U.S.C. 154(b) by 503 days.

(21) Appl. No.: 11/415,893

(22) Filed: May 2, 2006

(65) Prior Publication Data
US 2007/0257629 A1    Nov. 8, 2007

(51) Int. Cl.
*H02P 8/00*    (2006.01)
(52) U.S. Cl. ...................... 318/696; 318/685
(58) Field of Classification Search .............. 318/685, 318/696
See application file for complete search history.

(56) References Cited
U.S. PATENT DOCUMENTS

| | | | |
|---|---|---|---|
| 4,740,898 A | * | 4/1988 | McKee et al. .......... 701/70 |
| 4,774,669 A | * | 9/1988 | Schmitz et al. .......... 701/117 |
| 2006/0072265 A1 | * | 4/2006 | Bucella et al. .......... 361/90 |
| 2008/0088266 A1 | * | 4/2008 | Lucas et al. .......... 318/441 |

* cited by examiner

*Primary Examiner*—Walter Benson
*Assistant Examiner*—Erick Glass
(74) *Attorney, Agent, or Firm*—Ronald Reichman; Angelo N. Chaclas

(57) ABSTRACT

A method and a system are disclosed for preventing stepper motor control signals from being applied to a stepper motor drive circuit in order to stop a stepper motor when an interlock situation is present. A sequence of one or more control signals is generated by a motion control system and passed to one or more interlock logic gates connected in series. The interlock logic gates have an enable signal input which allows the control signals to pass through to the stepper motor drive circuit if the enable input signal is set to a logic level of "1". On the other hand, the interlock logic gates will prevent the control signals from reaching the stepper motor drive circuit if the enable input signal is set to a logic level of "0". The logic level of the enable input signal may be connected to a switch, relay, or an integrated circuit responsive to an interlock situation such as the opening of an access door.

9 Claims, 1 Drawing Sheet

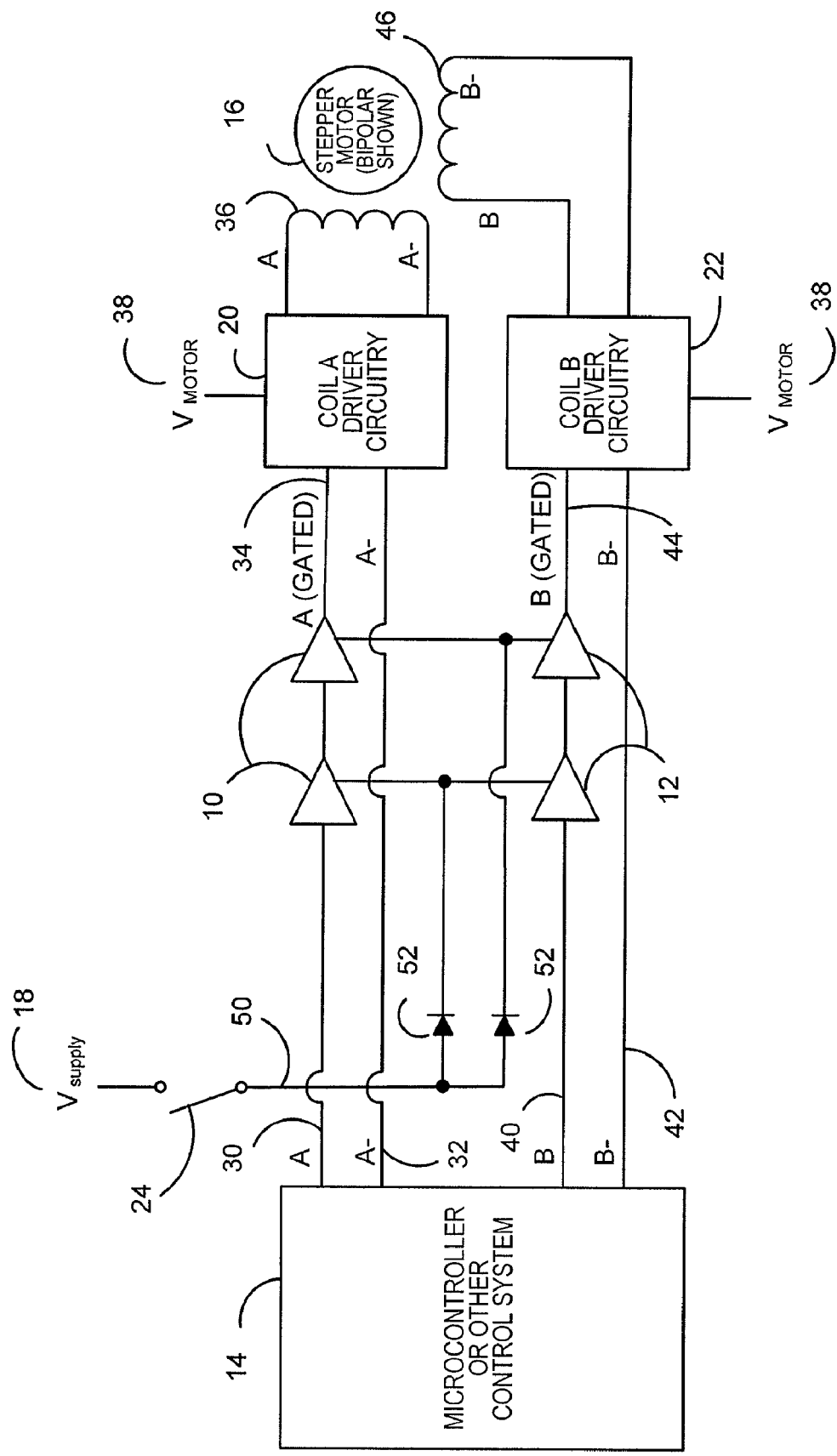

SAFETY INTERLOCK SYSTEM AND METHOD FOR DISRUPTING STEPPER MOTOR CONTROL SIGNALS

FIELD OF THE INVENTION

The present invention relates to safety interlock systems and, more particularly, to a system for preventing stepper motor control signals from being applied to, and to drive, a stepper motor once a service door or panel has been opened.

BACKGROUND OF THE INVENTION

Safety interlock systems for electrical devices are well known. Typically, they are found in devices that have high voltage components, including stepper motors, such as commercial material handling devices. Service or access doors on such devices will normally actuate an interlock switch which triggers the safety interlock system. When the door is closed, the contacts of the interlock switch are likewise closed, placing the safety interlock system in an "operating" or safe mode, wherein the motor power supply is connected to the device's stepper motors. When the door is opened (such as for repairing the device), the contacts of the interlock switch are open, which triggers the safety interlock system. When the safety interlock system is triggered, the stepper motor power supply is automatically interrupted to prevent a hazardous or energized condition.

Material handling devices have in the past used mechanical switches or relays to interrupt a motor's power supply. These mechanical switches and relays basically connect the various stepper motors housed in the device to the appropriate motor power supply source(s) when a start switch is actuated, and continue the connection until actuating power is interrupted. Once power is interrupted (whether deliberately by an "off" switch or unintentionally because of power failure), the contacts of the switch or relay open and electrically disconnect the stepper motors from the motor power supply sources until the device is restarted by an operator or a service technician.

More recently, with the use of higher current motors, and larger systems with more motors, larger switches and relays have been employed. This creates additional costs. Further, because of the mechanical nature of such switches and relays, high inrush and surge currents can occur when reconnecting high current motor power sources to such high current motor circuits. These high inrush and surge currents can damage switch and relay contacts as well as other electrical elements along the motor power source pathways. This can lead to breakdowns, reliability problems, and safety concerns.

There has thus arisen the need for an interlock system which interrupts the normal functioning of a stepper motor during an open-door condition without employing mechanical switches or relays to cut off the main motor power supply. It has, therefore, been proposed to minimize the risks noted above by providing a safety interlock system which interrupts the lower voltage/current stepper motor control signals instead of the motor power supply.

When triggered by an open-door condition, the safety interlock system of the invention interrupts the sequential stepper motor control signals used by the stepper motor drive circuits instead of the high current/high voltage motor power supply circuitry as seen in the prior art. Redundant interlock logic gates are employed to interrupt incoming stepper motor control signals in the absence of an "enable" signal. Thus, without the required sequential stepper motor control signals, the stepper motors cannot rotate or will rotate at a significantly reduced, and therefore safe, torque level.

SUMMARY OF THE INVENTION

There is provided, in accordance with the present invention, a safety interlock system responsive to the movement of a first structure (such as a user access door for an enclosed cabinet) relative to a second adjacent structure (such as the cabinet of a material handling device). The safety interlock system includes an interlock switch with an open and a closed position responsive to the opening or the closing of the cabinet door. The interlock switch is connected to the enable signal line of one or more redundant interlock logic gates.

Stepper motors can have more than one coil capable of being energized by a coil drive circuit. Typically, each drive coil has two input lines for motor control signals. The motor control signals are issued by a stepper motor motion control system. The redundant interlock logic gates are placed in series along at least one of the two input motor control signal lines for each coil.

In order for a stepper motor to rotate properly at its designed torque level, each coil drive circuit must receive the appropriate sequence of motor control signals from the stepper motor control system. When the redundant interlock logic gates are enabled (by receiving an enable signal from a closed interlock switch), the sequential motor control signals are passed through to the coil drive circuits. This, in turn, causes the coil drive circuits to energize the stepper motor coils in the proper sequence which drives the stepper motor to produces both rotation and torque.

On the other hand, if the interlock switch is placed in an opened condition, the enable signal is set to a logic level of "0" or low. When the enable signal is low, the redundant interlock logic gates prevent at least one motor control signal for each coil from passing through to the respective coil drive circuit. As such, the motor control signals produced by the motion control system cannot reach the coil drive circuits in the correct sequence. Thus, the stepper motor coils are not energized in the correct sequence. This prevents the stepper motor from rotating or producing any significant torque.

It is therefore an object of the present invention to provide a new and improved safety interlock system for disabling the motor control signals produced by a motion control system when an interlock switch is placed in an open condition in response to the opening of an access door.

It is another object of the present invention to provide such an interlock system which disables a stepper motor without interrupting the stepper motor power supply.

It is yet another object of the present invention to provide such an interlock system for the service or access doors of a cabinet of a material handling device.

These and other objects, features, and advantages of the present invention will become apparent from the following description and the attached drawing.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 1 is a circuit diagram illustrating a safety interlock system in the motion control circuit of a stepper motor in accordance with the present invention.

DETAILED DESCRIPTION OF THE PRESENT INVENTION

Referring now to FIG. 1, a simplified diagram of a motion control circuit is shown for the bipolar stepper motor 16. The stepper motor 16 is shown in FIG. 1 as a bipolar motor (having two coils or phases, the motor coil A 36 and the motor coil B 46). However, the same principles apply to a stepper motor with one coil (single phase) or three or more coils (phases).

With respect to the bipolar stepper motor 16, the motor coil A 36 is energized by the coil A drive circuit 20. Similarly, the motor coil B 46 is energized by the coil B drive circuit 22. Both the coil A drive circuit 20 and the coil B drive circuit 22 are powered by the motor supply voltage 38. That is, motor supply voltage 38 provides the proper voltage to energize motor coils A & B (36 & 46), whereas the coil A & B drive circuits (20 & 22) produce the proper sequence for energizing coils A & B (36 & 46) in response to control signals supplied by the stepper motor motion control system 14.

The stepper motor motion control system 14 provides several control signals which feed both the coil A & B drive circuits (20 & 22). With respect to the coil A drive circuit 20, the stepper motor motion control system 14 provides the A control signal 30 and the A– control signal 32. Similarly, with respect to coil B drive circuit 22, the stepper motor motion control system 14 provides the B control signal 40 and the B– control signal 42.

The redundant interlock logic gates 10 (for coil A) are placed in series and intercept the A control signal 30. The gated A control signal 34 exits the last of the interlock gates 10. Similarly, the redundant interlock logic gates 12 (for coil B) are placed in series and intercept the B control signal 40. The gated B control signal 44 exits the last of the interlock gates 12.

While the interlock gates 10 & 12 are shown only along one of the two control signal lines for each of the coil drive circuits 20 & 22, interlock logic gates may also be placed along each control signal line entering a coil drive circuit. Placing interlock logic gates along each control signal line, and connecting these interlock logic gates to interlock enable signal 50, will increase the safety factor provided by the present safety interlock system.

As shown in FIG. 1, the interlock logic gates 10 & 12 are redundant. That is, there are at least two interlock logic gates placed in series for each gated control signal output (the gated A control signal 34 and the gated B control signal 44). When using solid-state digital integrated circuits (the interlock logic gates 10 & 12) for safety interlock control, this redundancy is a requirement of the product safety compliance regulatory bodies such as the Underwriters Laboratories (UL). However, the present invention would operate in the same manner without the additional redundant interlock logic gate. The only requirement is that at least one gated control signal should enter each of the coil drive circuits (20 & 22). Accordingly, only one interlock logic gate is required for each gated control signal line to provide the described functionality.

The state of the gated A & B control signals (34 & 44) is determined by the state of the interlock enable signal 50. In turn, the state of the interlock enable signal 50 is determined by the position of the interlock switch 24. The interlock switch 24 determines whether the supply voltage 18 is passed to the interlock logic gates 10 & 12 by way of the interlock enable signal 50.

When the interlock switch 24 is in a closed position, in response to a closed access door (not shown), the interlock enable signal 50 is set to high or enabled. On the other hand, if the access door (not shown) is opened, and the interlock switch 24 is placed in a corresponding open state, the interlock enable signal 50 is set to low. The backflow diodes 52 are placed in series with the interlock enable signal 50 to prevent the backflow of current in the event any one of the interlock logic gates 10 & 12 fails.

The bipolar stepper motor 16 produces rotational motion in discrete steps. That is, the rotational position of the shaft (not shown) of the bipolar stepper motor 16 is determined sequentially based on the magnitude and direction of the current flowing through motor coils A & B (36 & 46). In order to produce proper rotation, each of the motor coils A & B (36 & 46) must be energized by the respective coil A & B drive circuits (20 & 22) in the proper directional sequence. If this sequence is not followed, the bipolar stepper motor 16 will either fail to rotate or rotate with a significantly reduced torque. Either situation is considered sufficiently safe and satisfies the criteria for a safety interlock result.

As described above, the motor control signals A, A–, B, and B– (30, 32, 40, and 42, respectively), are generated by the stepper motor motion control system 14, or any other similar motion control processor or controller. When a motor control signal is set to logic level "1" (or high), the corresponding side of the motor coil is driven to the motor supply voltage 38.

For example, if the A control signal 30 is set to "1" (or high), and the A– control signal 32 is set to "0" (or low), the coil A drive circuit 20 drives the A side of the motor coil A 36 to the positive (+) motor supply voltage 38. Similarly, the coil A drive circuit 20 drives the A– side of the motor coil A 36 to ground.

On the other hand, if the A– control signal 32 is set to "1" (or high), and the A control signal 30 is set to "0" (or low), the coil A drive circuit 20 drives the A– side of the motor coil A 36 to the positive (+) motor supply voltage 38. At the same time, the coil A drive circuit 20 drives the A side of the motor coil A 36 to ground. That is, if a control signal is set to logic level "0" (or low), the corresponding side of the motor coil is switched to ground with respect to the motor supply voltage 38.

When the motor control signals A, A–, B, and B– (30, 32, 40, and 42, respectively) are sequenced in the proper order, and at the proper rate, the motor coils A & B (36 & 46) are correspondingly energized such that the stepper motor 16 rotates at the appropriate speed while producing the proper torque.

In normal operation, the interlock switch 24 is closed, which sets the interlock enable signal 50 to logic level "1" (high or enabled). In turn, when the interlock enable signal 50 is high, or enabled, the interlock logic gates (10 & 12) are also enabled. Thus, in normal operation, the interlock logic gates (10 & 12) pass the A control signal and the B control signal along, as the gated A control signal 34 and the gated B signal 44, respectively, to the respective coil A & B drive circuits (20 & 22). At the same time, the coil A & B drive circuits (20 & 22) also receive the A– and B– control signals (32 & 42, respectively). As such, the stepper motor 16 operates normally. However, when the interlock switch 24 is opened, indicating an open-door condition, the situation changes.

An open-door condition opens the contacts of the interlock switch 24. This, in turn, sets the interlock enable signal 50 to logic level "0" (low or not enabled). When the interlock enable signal 50 is low or not enabled, the interlock logic gates 10 & 12 disrupt the A & B control signal (30 & 40) generated by the stepper motor motion control system 14. Accordingly, the gated A & B control signals (34 & 44) will remain at a steady state and will not correspond to the properly sequenced A & B control signals (30 & 40) generated by the stepper motor motion control system 14.

As described above, the interlock logic gates 10 & 12 are enabled, which allows an input signal to pass as an output, when the interlock enable signal 50 is set to logic level "1" (or high). On the other hand, the interlock logic gates 10 & 12 may have the opposite enabling functionality and pass signals when the interlock enable signal 50 is set to logic level "0" (or low). Of course, to maintain the above-described interlock control, the interlock switch 24 would have to have a logic level "0" (or low) state when it is in a closed contacts position.

Since the gated A & B control signals are not properly sequenced, the respective coil A & B drive circuits (20 & 22) are unable to energize motor coils A & B (36 & 46) at the corresponding sequence. Therefore, the stepper motor 16 will either fail to rotate or will rotate but produce a significantly reduced torque. Either way, the stepper motor 16 is placed in a safe or interlocked mode and can only be brought back to a normal working state when and if the interlock switch 24 is again closed.

While the present invention has been disclosed and described with reference to an embodiment thereof, it will be apparent, as noted above, that variations and modifications may be made therein without departing from the scope of the invention, and it is intended that all matter contained in the above description or shown in the accompanying drawing shall be interpreted as illustrative and not in a limiting sense. The invention disclosed herein can be implemented by a variety of combinations of hardware and software, and those skilled in the art will understand that those implementations are derivable from the invention as disclosed herein. It is, thus, intended in the following claims to cover each variation and modification that falls within the true spirit and scope of the present invention.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. Thus, it is intended in the following claims to cover each variation and modification that falls within the true spirit and scope of the present invention.

What is claimed is:

1. An interlock system for operatively connecting a stepper motor motion control system to a stepper motor drive circuit, comprising:
    a motion control system, wherein the motion control system generates at least one stepper motor control signal;
    a drive circuit, wherein the drive circuit energizes at least one coil of a stepper motor in response to the at least one stepper motor control signal; and
    an interlock logic gate having an enable signal input, wherein the interlock logic gate receives the at least one stepper motor control signal from the motion control system and passes the motor control signal to the drive circuit if the enable signal input is set to a logic level of "1", or prevents the motor control signal from reaching the drive circuit if the enable signal input is set to a logic level of "0".

2. The interlock system of claim 1 further comprising:
    a switch having an open contacts position and a closed contacts position, wherein the switch is operatively connected to the enable signal input of the interlock logic gate.

3. The interlock system of claim 2, wherein the switch is set at a logic level of "1" when it is in the closed contacts position, and is set at a logic level of "0" when it is in the open contacts position.

4. An interlock system for operatively connecting a stepper motor motion control system to a stepper motor drive circuit, comprising:
    a motion control system, wherein the motion control system generates at least one stepper motor control signal;
    a drive circuit, wherein the drive circuit energizes at least one coil of a stepper motor in response to the at least one stepper motor control signal; and
    a redundant interlock logic gate comprising a first interlock logic gate and a second interlock gate operatively connected in series, wherein the first interlock logic gate and the second interlock logic gate have an enable signal input, and wherein the redundant interlock logic gate receives the at least one stepper motor control signal from the motion control system and passes the motor control signal to the drive circuit if the enable signal input of the first and second interlock logic gates is set to a logic level of "1", or prevents the motor control signal from reaching the drive circuit if the enable signal input of the first and second interlock logic gates is set to a logic level of "0".

5. The interlock system of claim 4 further comprising:
    a switch having an open contacts position and a closed contacts position, wherein the switch is operatively connected to the enable signal inputs of the first and second interlock logic gates.

6. The interlock system of claim 5, wherein the switch is set at a logic level of "1" when it is in a closed contacts position, and is set at a logic level of "0" when it is in the open contacts position.

7. A method of disconnecting a stepper motor motion control system from a stepper motor drive circuit, comprising:
    generating at least one stepper motor control signal;
    passing the at least one stepper motor control signal to an interlock logic gate, wherein the interlock logic gate has an enable signal input;
    passing the at least one stepper motor control signal from the interlock logic gate to a drive circuit if the enable signal input is set to a logic level of "1"; and
    not passing the motor control signal from the interlock logic gate to the drive circuit if the enable signal input is set to a logic level of "0";

8. The method of disconnecting a stepper motion control system from a stepper motor drive circuit of claim 7, further comprising:
    energizing at least one coil of a stepper motor by way of the drive circuit in response to the at least one stepper motor control signal passed to the drive circuit from the interlock logic gate.

9. The method of disconnecting a stepper motion control system from a stepper motor drive circuit of claim 7, further comprising:
    setting the enable signal input of the interlock logic gate to a logic level of "1" in response to the closure of a switch, wherein the switch has an open contacts position and a closed contacts position; and
    setting the enable signal input of the interlock logic gate to a logic level of "0" in response to the opening of a switch, wherein the switch has an open contacts position and a closed contacts position.

* * * * *